Oct. 4, 1932.                F. E. ALTMAN                1,880,393
PHOTOGRAPHIC OBJECTIVE
Filed Nov. 29, 1930

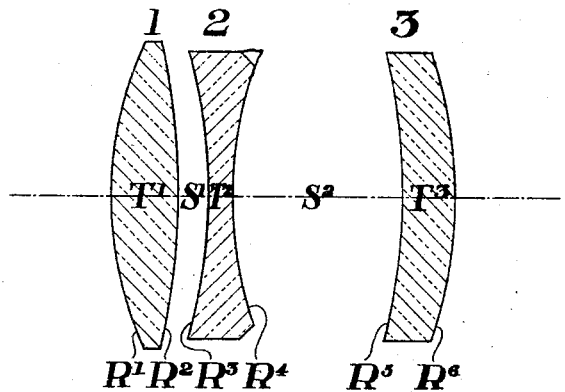

F.6.8: Focal Length = 100.00

| Lens | Focal Length | Glass | Radii | Thickness & Separation |
|------|--------------|-------|-------|------------------------|
| 1 | +34.52 | D=1.611<br>G'=1.624<br>$\nu$=57.2 | $R^1$=24.06<br>$R^2$=196.10 | $T^1$=2.96<br>$S^1$=1.89 |
| 2 | −28.63 | D=1.575<br>G'=1.593<br>$\nu$=41.4 | $R^3$=54.52<br>$R^4$=24.85 | $T^2$=1.18<br>$S^2$=6.80 |
| 3 | +75.68 | D=1.523<br>G'=1.534<br>$\nu$=59.0 | $R^5$=183.80<br>$R^6$=33.36 | $T^3$=2.66 |

Focal Length of Front Component is −529.72

Inventor,
Fred E. Altman,
By Newton M. Perrin
Rolla N. Carter
Attorneys

Patented Oct. 4, 1932

1,880,393

UNITED STATES PATENT OFFICE

FRED E. ALTMAN, OF ROCHESTER, NEW YORK, ASSIGNOR TO EASTMAN KODAK COMPANY, OF ROCHESTER, NEW YORK, A CORPORATION OF NEW YORK

PHOTOGRAPHIC OBJECTIVE

Application filed November 29, 1930. Serial No. 499,006.

My invention relates to a photographic objective and more particularly to an objective comprising three air spaced elements of the same general type disclosed and claimed in my U. S. Patent No. 1,658,365.

My objective in the above patent was designed to work with an aperture of "f.8" and gave very good results using barium crown glass in both positive elements. However, this objective when working with an aperture of "f.6.8" had pronounced spherical aberration, and was not otherwise completely satisfactory.

It is an object of my invention to provide an objective of this general type in which the outer elements are positive and the inner one is negative and which may be properly corrected when working with an aperture of "f.6.8".

The two elements comprising the front component are substantially the same as those in my prior objective, but when working with an aperture of "f.6.8" the negative element over-corrects the spherical aberration and in order to reduce the value of the spherical aberration, I use a glass of low index and low dispersive power for the rear positive element of meniscus form. I have found that if I make the rear positive element of a glass having a refractive index less than 1.53 for the D line and a dispersive ratio of more than 58, the spherical aberration of the objective is satisfactorily corrected and at the same time permits correction for chromatic aberration as well as other desirable corrections.

In the accompanying table is set forth the data of a preferred example.

The objective here specified is designed to work at "f.6.8" and is corrected for freedom from distortion, chromatic and spherical aberration, coma and astigmatism. In the table and on the accompanying drawing the successive lenses from front to rear are designated 1 to 3 respectively; the radii of curvature of the successive surfaces, $R^1$ to $R^6$; the thicknesses of the successive lenses, $T^1$ to $T^3$, and the widths of the air spaces $S^1$ to $S^2$. There is also given in the table the focal length of each of the lenses and the index of refraction of the glass for the D and G' lines and the value of the dispersive ratio $(\nu)$ for the glass used.

Dimensions are given in decimals of the focal length of the complete objective.

Table for objective with aperture = "f.6.8"; focal length = 100.00.

| Lens | Focal length | Glass | Radii | Thickness and separation |
|---|---|---|---|---|
| 1 | +34.52 | D = 1.611<br>G' = 1.624<br>$\nu$ = 57.2 | $R^1$ = 24.06<br>$R^2$ = 198.10 | $T^1$ = 2.96<br>$S^1$ = 1.98 |
| 2 | 28.63 | D = 1.573<br>G' = 1.593<br>$\nu$ = 41.4 | $R^3$ = 54.52<br>$R^4$ = 24.85 | $T^2$ = 1.18<br>$S^2$ = 6.80 |
| 3 | +75.68 | D = 1.523<br>G' = 1.534<br>$\nu$ = 59.0 | $R^5$ = 183.80<br>$R^6$ = 33.36 | $T^3$ = 2.66 |

The focal length of the rear component is, of course, that of its single element, +75.68, while that of the front component is −529.72.

It may be mentioned that the focus of the objective may be adjusted by movement of lens 1 towards and from lens 2, as in a screw threaded mount. The objective can, therefore, be used on a fixed lens board and be focused by this means.

It is to be understood that the above specified objective is an example and that I contemplate as within the scope of my invention such modifications and equivalents as fall within the terms of the appended claims.

What I claim as new and desire to secure by Letters Patent of the United States is:

1. A photographic objective of the type having a dispersive component consisting of an outer positive lens and an inner negative lens spaced apart and a second component comprising a single positive meniscus lens, the front positive lens being of barium crown glass and the negative lens being of flint glass having a refractive index less than 1.60 characterized by the single positive meniscus lens being of glass having a refractive index less than 1.53 and having a focal length approximately three-quarters of the focal length of the objective.

2. A three-element photographic objective comprising an unsymmetrical negative single lens spaced between two positive single lenses, one of the latter lenses being of glass having the refractive index greater than 1.60 and is disposed in front of said negative lens and the other being of glass having refractive index less than 1.53 and is disposed behind said negative lens characterized by the front component consisting of the negative and the front positive lenses being dispersive and having a combined focal length at least five times greater than the equivalent focal length of the objective.

Signed at Rochester, N. Y., this 17th day of November, 1930.

FRED E. ALTMAN.